US012317016B2

(12) United States Patent
Diego Regla et al.

(10) Patent No.: US 12,317,016 B2
(45) Date of Patent: May 27, 2025

(54) MICROPHONE DEVICE WITH A CLOSED HOUSING AND A MEMBRANE

(71) Applicant: HARMAN INTERNATIONAL INDUSTRIES, INCORPORATED, Stamford, CT (US)

(72) Inventors: Pablo Diego Regla, Budapest (HU); Zsolt Marton, Zalaegerszeg (HU)

(73) Assignee: Harman International Industries, Incorporated, Stamford, CT (US)

( * ) Notice: Subject to any disclaimer, the term of this patent is extended or adjusted under 35 U.S.C. 154(b) by 143 days.

(21) Appl. No.: 17/971,106

(22) Filed: Oct. 21, 2022

(65) Prior Publication Data

US 2023/0131440 A1 Apr. 27, 2023

(30) Foreign Application Priority Data

Oct. 26, 2021 (EP) .................................... 21204796

(51) Int. Cl.
*H04R 1/02* (2006.01)
*H04R 1/08* (2006.01)

(52) U.S. Cl.
CPC ................ *H04R 1/02* (2013.01); *H04R 1/08* (2013.01)

(58) Field of Classification Search
CPC ........ H04R 1/02; H04R 1/08; H04R 2225/67; H04R 1/222; H04R 25/00; Y10T 29/49572; B33Y 80/00
See application file for complete search history.

(56) References Cited

U.S. PATENT DOCUMENTS 2,552,878 A 5/1951 Wiggins
2010/0092021 A1* 4/2010 Wiskerke ................ H04R 1/08 29/896.21
2012/0250925 A1* 10/2012 Lillelund ............ H04R 19/016 29/832
2014/0044297 A1 2/2014 Loeppert et al.
2014/0161295 A1* 6/2014 Huang .................. H04R 1/406 381/357
2016/0234594 A1* 8/2016 Ogura ................ B60R 11/0247
2017/0041692 A1* 2/2017 Watson ................. H04R 19/04
(Continued)

FOREIGN PATENT DOCUMENTS

WO 2020224903 A1 11/2020

OTHER PUBLICATIONS

European Search Report dated Apr. 29, 2022 for European Patent Application No. 21204796.3, 10 pages.
(Continued)

*Primary Examiner* — Carolyn R Edwards
*Assistant Examiner* — Julie X Dang
(74) *Attorney, Agent, or Firm* — Brooks Kushman P.C.

(57) ABSTRACT

The disclosure relates to a microphone device. The microphone device comprises a closed housing with a sidewall, a microphone arranged within the closed housing, and a membrane at an outer surface of the sidewall wherein a first part of the sidewall has a first thickness and wherein the membrane is comprised by, in particular is formed by, a second part of the sidewall having a second thickness smaller than the first thickness. The disclosure further relates to a method for generating the microphone device. The microphone device protects the microphone from water or particles at high protection level.

18 Claims, 5 Drawing Sheets

(56) References Cited

U.S. PATENT DOCUMENTS

| | | | | |
|---|---|---|---|---|
| 2018/0362332 | A1 | 12/2018 | Khenkin et al. | |
| 2019/0297414 | A1* | 9/2019 | Gorny | G03B 31/06 |
| 2019/0335262 | A1* | 10/2019 | Szczech | B81C 1/00158 |
| 2020/0045476 | A1* | 2/2020 | Wang | B81B 7/0061 |

OTHER PUBLICATIONS

Bernard, A., "Understanding the IP69K Rating: Numbers clarify protection levels for liquids and solids", Aug. 7, 2014, 8pgs., Retrieved from https://www.plantengineering.com/articles/understanding-the-ip69k-rating/ on Feb. 8, 2023.

European Office Action dated Mar. 13, 2025 for European Application No. 21204796.3 filed Oct. 26, 2021, 8 pgs.

* cited by examiner

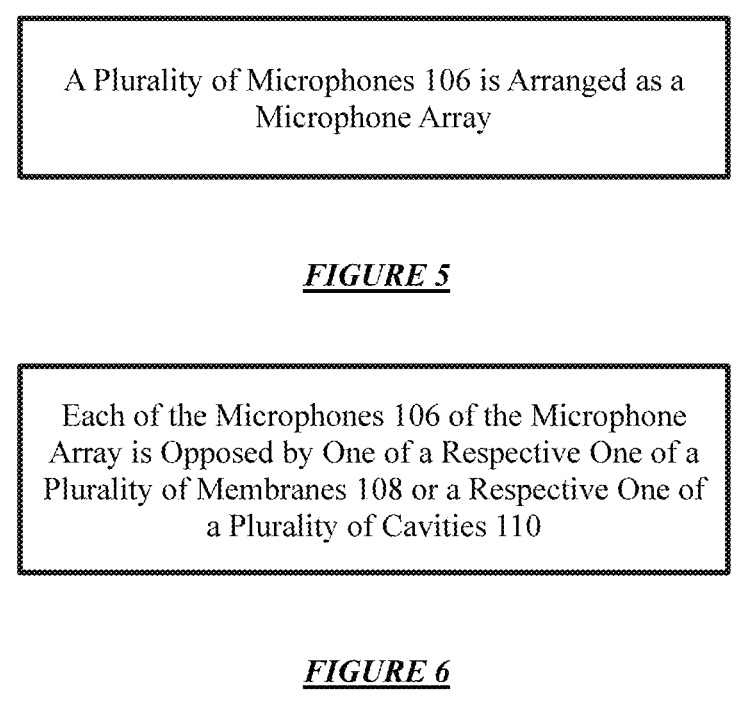

A Plurality of Microphones 106 is Arranged as a Microphone Array

*FIGURE 5*

Each of the Microphones 106 of the Microphone Array is Opposed by One of a Respective One of a Plurality of Membranes 108 or a Respective One of a Plurality of Cavities 110

*FIGURE 6*

MICROPHONE DEVICE WITH A CLOSED HOUSING AND A MEMBRANE

CROSS-REFERENCE TO RELATED APPLICATIONS

This application claims priority to European application Serial No. 21204796.3 filed Oct. 26, 2021, the disclosure of which is hereby incorporated in its entirety by reference herein.

TECHNICAL FIELD

The present disclosure relates to a microphone device and a method for generating the device. In particular, the disclosure relates to methods and systems for protecting microphones from water and solid particles at an Ingress Protection (IP) 69K ("IP69K") standard.

BACKGROUND

With the growth of driving assistance technologies and autonomous driving vehicles, the amount of sensors in a car has grown extensively. Due to the development of these technologies, it has become necessary to detect sound from outside a vehicle such as emergency vehicles, pedestrians or events happening in the surroundings of the car. Therefore, a number of microphones positioned on the exterior body or surface of the vehicle is required. These microphones must withstand the usage of the car in different driving scenarios. In particular, external entities including water, ice, dust or debris could potentially alter the performance of any sensor such as a microphone and thereby jeopardize, for instance, integrated safety systems of the vehicle.

To enable a robust performance, it is desirable to achieve highest protection levels of sensors such as microphones. To achieve IP ratings as high as IP69K, a system is required to withstand exposure to water at high-pressure and high temperature. For example, a car may be exposed to such conditions when hit by a water jet for car washing or similar.

Without protection, any such exposures could lead to a malfunction of the sensors such as a microphone, and thereby to a malfunction of the vehicle or a loss of safety for the occupants. In case of a self-driving vehicle, the level of autonomous driving could decrease and require human interaction, or a sensor malfunction may force a complete stop of vehicle.

Therefore, there is a need for protection systems for sensors, such as microphones.

SUMMARY

A first aspect of the present disclosure relates to a microphone device. The microphone device comprises a closed housing with a sidewall, a microphone arranged within the closed housing, and a membrane at an outer surface of the sidewall, wherein a first part of the sidewall has a first thickness and wherein the membrane is comprised by, in particular is formed by, a second part of the sidewall having a second thickness smaller than the first thickness.

The microphone device allows protecting a microphone against external entities such as water or dust particles. The device enables a protection at high level standards, in particular with the IP69K standard, due to the use of a closed housing, i.e., a housing without openings. A closed housing may thus also be referred to as a waterproof housing. Instead of sound waves reaching the microphone by air or holes in the housing, through which also water and dust can enter, the sound is transmitted and/or reflected from the outside to the inside of the housing by membrane parts in the housing. The sound waves which hit the membrane area generate a vibration of this specific area of the housing and a new sound wave is created inside the microphone housing. This new sound wave then reaches the microphone. For example, the microphone element may be a micro-electro-mechanical system (MEMS) microphone and situated on a printed circuit board, PCB, inside the housing. The sound may then reach the microphone through a port hole inside the PCB. The microphone element may alternatively be a top-ported MEMS microphone, wherein the microphone is situated on a PCB facing the membrane. Alternatively, the microphone element may comprise other microphone sensor, for example, in an ECM capsule architecture. The thickness of the sound transfer area may be determined by the acoustical and mechanical properties of the intended material of the housing. Thus, the material selection may influence or determine the performance of the microphone.

The sidewall of the housing may be formed in one piece. In other words, the membrane is formed by a thinner part of the sidewall of the housing. Thereby, the housing has no openings through which water and/or dust particles may enter. Hence, no additional integration of an external membrane through, for example, adhesion or sealed attachment is necessary. This further reduces the risk of producing openings in the housing.

Further in an embodiment, a cavity is arranged between the membrane and the microphone, in particular, the sidewall is arranged adjacent to the cavity and/or the cavity is arranged within the sidewall. The size and/or form of the cavity may be chosen such that the transmission of the sound from the outside of the housing to the microphone is optimized.

In an embodiment, the membrane covers the cavity. The membrane may be formed by a thinner area of the sidewall of the housing as described above. The membrane may alternatively be an additional, external membrane. The cavity may be comprised by a hole in the sidewall of the housing. In this case, the external membrane covers the cavity, i.e., the hole, within the sidewall of the housing. This also results in a closed housing without holes through which water and/or dust particles may enter the housing. Further, the use of an external membrane allows choosing different materials for the membrane and the housing. Thereby, for example, suitable material for a good sound wave transmission/reflection may be chosen for the membrane, while suitable materials with, for example, good mechanical properties may be chosen for the housing. Further, materials can be exploited as membranes, for which a necessary membrane thickness not easily achieved by production methods for the housing. The external membranes may be applied and sealed to the sidewall of the housing enabling an enclosed housing without openings.

According to an embodiment, the microphone device further includes at least one support element, wherein the at least one support element retains the microphone at a fixed position relative to the housing and/or the sidewall of the housing. In one embodiment, the at least one support element is arranged between the microphone and the membrane. Thereby, within the housing, the sound wave may propagate through (an opening of) the at least one support element.

In one embodiment, the cavity is confined by the sidewall of the closed housing, in particular by the second part of the sidewall of the housing, and the one or more support elements. In other words, the microphone is situated at a fixed position within the housing by a support element. An exemplary support element may be a printed circuit board (PCB). Thereby, a controlled transmission of a sound wave (e.g., through the cavity and/or the support element) between the housing and the microphone and, in particular, a controlled receipt of the sound wave by the microphone is enabled. Further, an exemplary support element may confine the cavity between the membrane area of the sidewall of the housing and the microphone. In an example, a first support element may be a PCB holding the microphone and a second support element may be a plastic or elastomer element with a cylindrical or conical shape and/or a cylindrically or conically shaped opening enclosing the cavity between the membrane area and the PCB. Thereby, the volume and shape of the cavity can be tailored, the sound transmission properties of the cavity and/or the support element can be tuned and, thus, the sound wave transmission can be controlled.

Further, according to an embodiment, the at least one support element seals the cavity against an inner space of the housing. The support element may be a plastic element with a cylindrical or conical opening enclosing the cavity. The support element may protect the cavity from water and/or particles coming in and avoids sound waves exiting the cavity into other areas within the housing. Thereby, the support element defines the space for wave transmission.

In another embodiment, at least a part of the at least one support element is embedded within the sidewall of the housing, in particular within the cavity. This enables a sealed implementation of the support element(s) and improves mechanical stability of the microphone device, in particular of the sidewall of the housing.

According to another embodiment, the microphone is arranged on the at least one support element opposite the membrane and/or adjacent to the cavity and/or the at least one support element comprises an opening between the cavity and the microphone. For example, the support element may be a PCB and the opening between the cavity and the microphone may be port hole in the PCB. Positioning the support element opposite to the membrane and adjacent to the cavity enables an enclosed space for wave transmission.

According to an embodiment, the cavity and/or the at least one support element has a conical or cylindrical shape. The shape may determine the sound transmission within the cavity and/or the at least one support element. Changing the shape enables, for example, tuning of the frequency response within the cavity and/or the at least one support element.

According to an embodiment, the at least one support element is made of plastic or rubber. The use of elastomeric materials allows for an easy, sealed integration of the support element between the inner sidewall of housing and the microphone or another support element, for example a PCB holding the microphone or any other casing of the microphone.

The invention further comprises, according to an embodiment a plurality of microphones arranged as a microphone array. The microphone array may comprise any number of microphones operating in tandem. Microphone arrays allow for better extraction of sound input from ambient noise and/or enable the localization of acoustic sources.

Further, according to an embodiment, each of the microphones of the microphone array is opposed by a respective one of a plurality of membranes and, preferably, by a respective one of a plurality of cavities. Thereby, each microphone is protected. Further, the sound transmission through the membrane and the cavity may be adjusted for each microphone. For example, the direction of incoming sound waves can be detected.

Another aspect of this disclosure relates to a method for generating the microphone device. The method comprises providing a closed housing with a sidewall, providing a membrane at an outer surface of the sidewall and placing a microphone within the housing, wherein a first part of the sidewall has a first thickness and wherein the membrane is comprised by, in particular is formed by, a second part of the sidewall having a second thickness smaller than the first thickness.

According to one embodiment, the method further comprises forming a cavity within the sidewall of the housing, in particular wherein the cavity is arranged between the microphone and the membrane. All properties of the microphone device of the present disclosure also apply to the method.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

FIG. 5 depicts one aspect related to the first microphone device according to one embodiment; and FIG. 6 depicts another aspect related to the first microphone device according to one embodiment.

DETAILED DESCRIPTION

Figure 1:
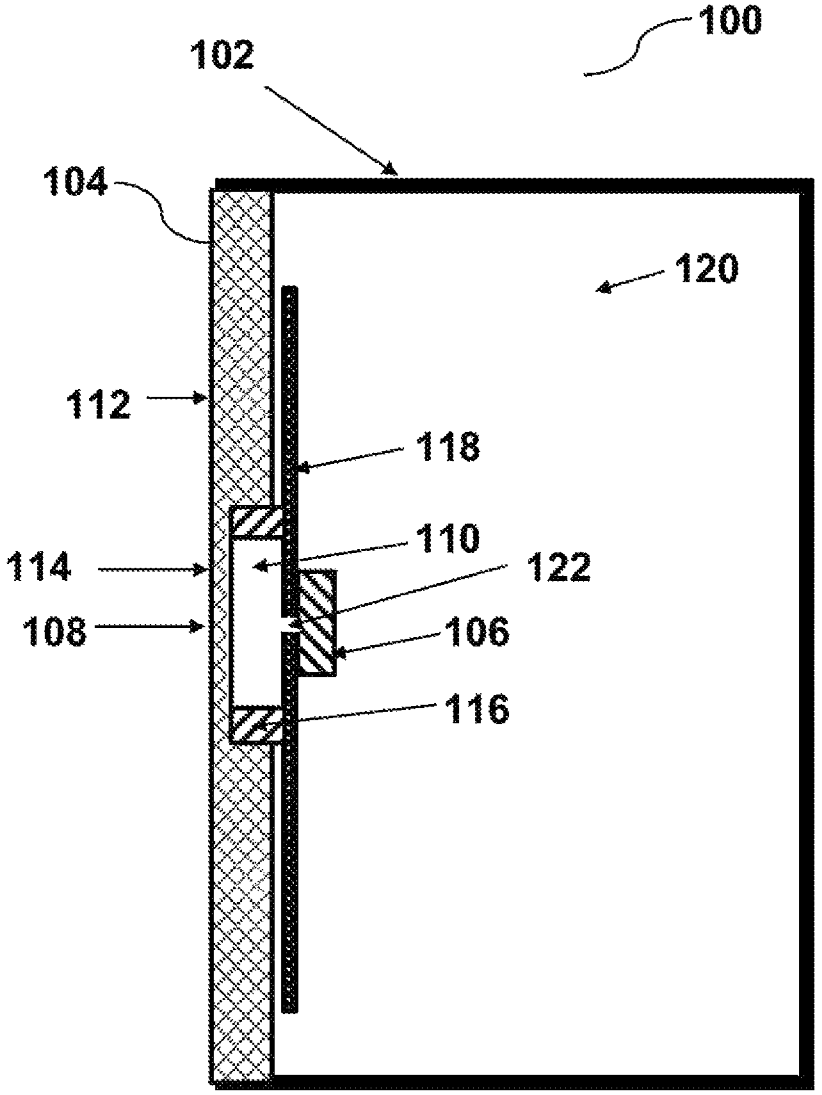
FIG. 1 depicts a schematic of a first microphone device according to an embodiment.

FIG. 1 depicts a schematic of a first microphone device. The microphone device 100 comprises a closed housing 102 with a sidewall 104 and a microphone 106 arranged within the closed housing 102. The microphone 106 may be a Micro-Electro-Mechanical-System (MEMS) microphone. At the outer of surface of the sidewall 104, a membrane 108 is situated. A cavity 110 is located between the membrane 108 and the microphone 106. The cavity 110 is located within the sidewall 104 of the closed housing 102. The distance between the cavity 110 and the microphone 106 may be below 2 mm, for example 1.6 mm. The cavity 110 may be filled with air. A first part 112 of the sidewall 104 has a first thickness. The first thickness may be in the range of 1-2 millimeters. The membrane 108 may be comprised by, or in particular formed by, a second part 114 of the sidewall 104. The second part 114 of the sidewall 104 may have a thickness below 1 mm, in particular between 0.2 mm and 0.8 mm, more particularly of 0.4 mm. The second part 114 of the sidewall 104 covers the cavity 110 within the housing 102. The second part 114 may have a lateral size between 0.5 cm and 1.5 cm, in particular a diameter or side length of 10 mm or 12 mm. The second part 114 forming the membrane 108 and sidewall 104 may be made of the same material, for example, one of a polymeric material, metallic material, steel, glass or a composite material.

The microphone device 100 further comprises two support elements 116, 118. The first support element 118 retains the microphone 106 at a fix position relative to the housing 102. The first support element 118 may comprise a printed circuit board, PCB, which covers the microphone and forms spaces for other devices, such as MEMS devices. The first support element 118 comprise a port hole 122 forming a channel between the cavity 110 and the microphone 106. The microphone device 100 comprises a second support element 116. The second support element 116 confines the cavity 110 between the membrane 108 and the microphone 106 or between the membrane 108 and the first support element 118. The second support element 116 seals the cavity 110 against an inner space 120 of the housing 102. The second support element 116 is partially embedded within the sidewall 104 of the housing 102, more particularly within the cavity 110. The cavity 110 may have a conical or cylindrical shape. The second support element 116 enclosing the cavity 110 may be of plastic or elastomer or another polymeric material.

Figure 2:
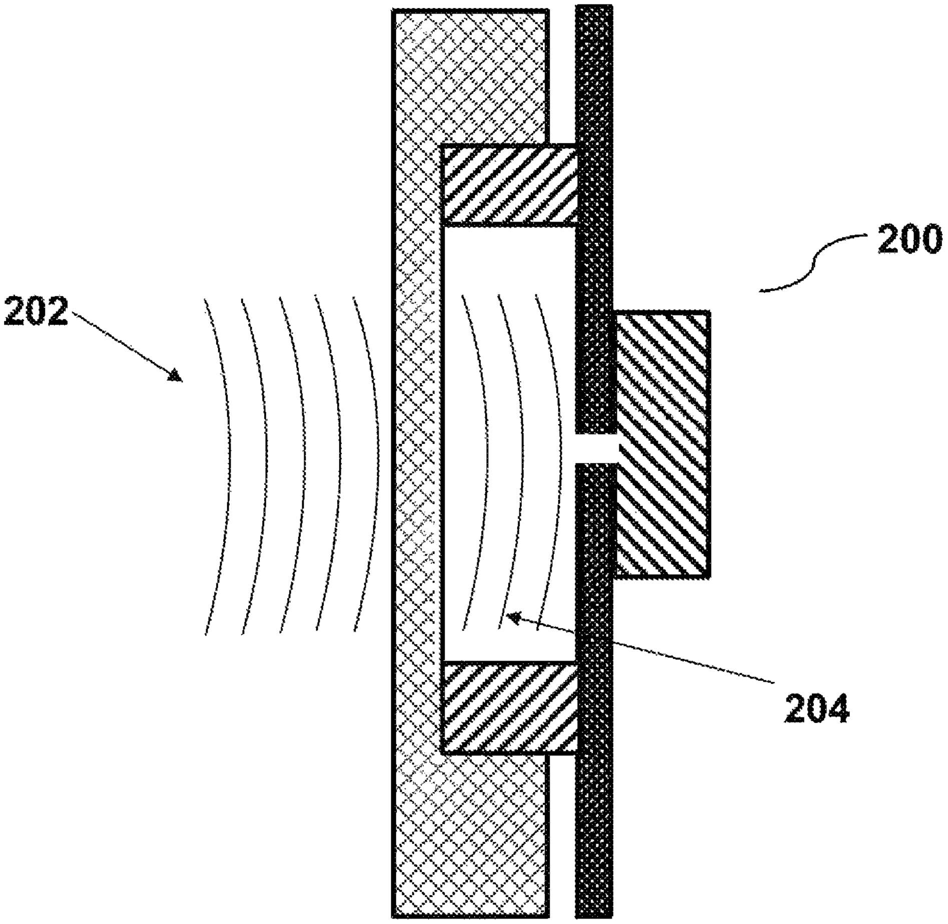
FIG. 2 depicts a schematic of a sound wave transmission through the first microphone device according to an embodiment.

FIG. 2 depicts a schematic 200 of the working principle of the microphone device 100. An outer sound wave 202 hits the membrane 108 of the sidewall. FIG. 2 is depicted further in reference to FIG. 1. The sound wave is then transmitted via the membrane 108 into the cavity 110. This inner sound wave 204 may then enter the microphone 106. The shape of the support elements 116 and 118 and the material of the support elements 116 and 118 may determine the frequency response within the cavity 110.

Figure 3:
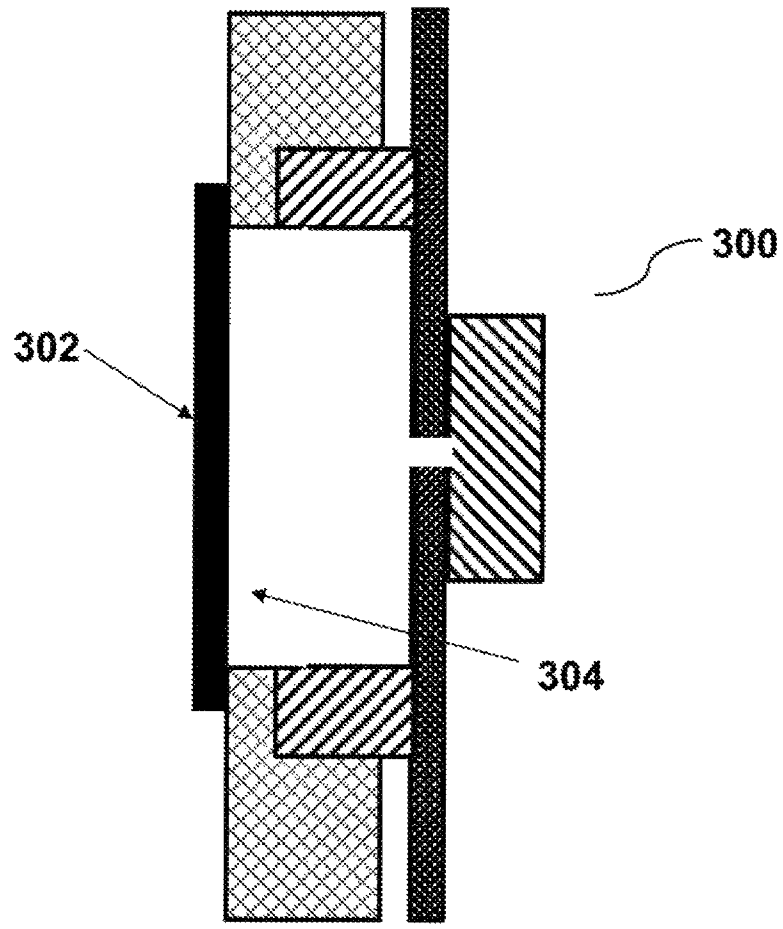
FIG. 3 depicts a schematic of a second microphone device according to another embodiment.

FIG. 3 depicts a second microphone device 300 according to another embodiment. Aspects of FIG. 3 include one or more features as set forth in connection with FIG. 1. According to this embodiment, the sidewall 104 of the housing includes an opening 304. This opening 304 is adjacent to the cavity 110 within the housing. The opening 304 in the sidewall 104 is covered by an external membrane 302. The opening 304 in the sidewall may be circular or rectangular. The opening 304 may have a lateral size between 0.5 cm and 1.5 cm, in particular a diameter or side length of 10 mm or 12 mm. The membrane 302 may be comprised by a different material than the sidewall of the housing. The membrane 302 may have a thickness below 1 mm, in particular between 0.2 mm and 0.8 mm. The membrane 302 may be made of a polymeric material, metallic material, steel, glass or a composite material. The membrane 302 may be applied sealed to the sidewall 104. For example, the membrane 302 may be adhered to the sidewall 104 or applied by injection molding.

According to another embodiment, the microphone device 100, 300 may comprise a plurality of microphones 106 arranged as a microphone array. Each of the microphones 108 of the microphone array may be opposed by a respective one of a plurality of membranes 108 and a respect of one of a plurality of cavities 110.

Figure 4:
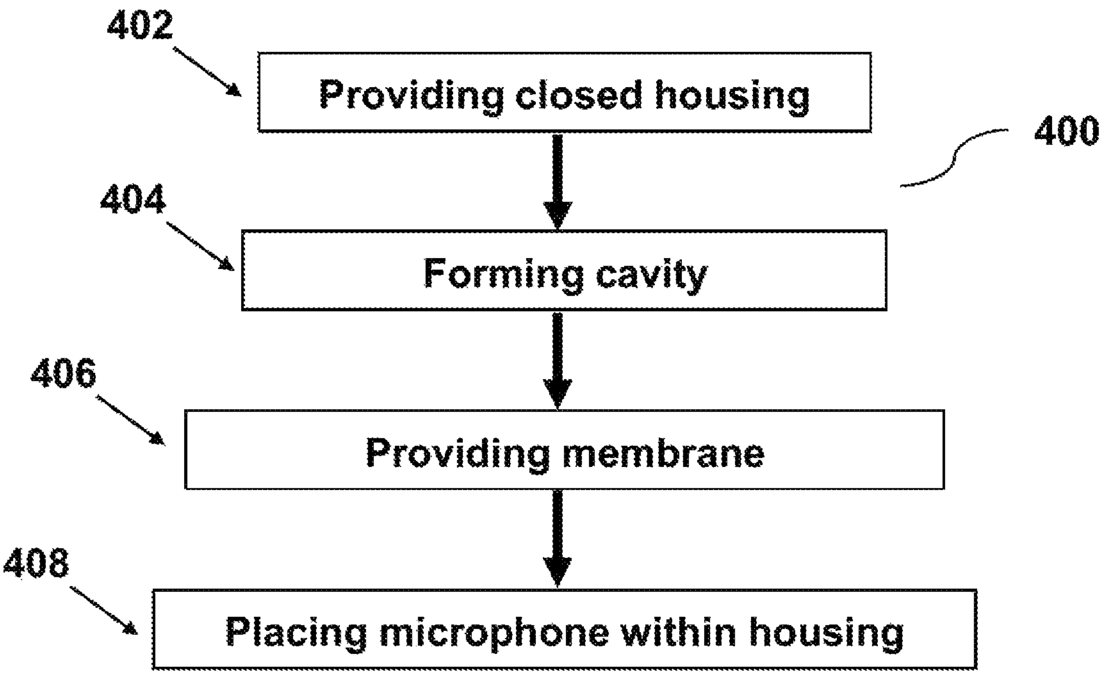
FIG. 4 depicts a flow chart of a method for generating a microphone device.

FIG. 4 depicts the flow diagram of a method for generating the microphone device 100 of any of the above embodiments. The method comprises providing a closed housing 102 within the sidewall 104 in step 402, forming a cavity 110 within the sidewall 104 of the housing 102 in step 404, providing a membrane 108, 302 at an outer surface of the sidewall 104 in step 406 and placing a microphone 106 within the housing at step 408. The cavity 110 is arranged between the microphone 106 and the membrane 108.

FIG. 5 depicts one aspect related to the first microphone device according to one embodiment. For example, FIG. 5 includes a first plurality of microphones 106 is arranged as a microphone array.

FIG. 6 depicts another aspect related to the first microphone device according to one embodiment. For example, FIG. 6 includes that each of the microphones 106 of the microphone array is opposed by one of a respective one of a plurality of membranes 108 or a respective one of a plurality of cavities 110.

REFERENCE SIGNS

100 First microphone device according to an embodiment
102 Closed housing
104 Sidewall of the housing
106 Microphone
108 First membrane
110 Cavity
112 First part of the sidewall
114 Second part of the sidewall
116 First support element
118 Second support element
120 Inner space of the housing
122 Opening in the second support element
200 Schematic of the sound wave transmission through a microphone device
202 Sound wave outside the housing
204 Sound wave inside the cavity
300 Second microphone device according to another embodiment
302 Second membrane
304 Opening in the sidewall
400 Method for generating a microphone device
402-408 Steps of the method 400

What is claimed is:

1. A microphone device comprising:

a waterproof closed housing with a sidewall;

a microphone arranged within the waterproof closed housing, a membrane at an outer surface of the sidewall, wherein a first part of the sidewall has a first thickness and wherein the membrane is comprised by, in particular is formed by, a second part of the sidewall having a second thickness that is smaller than the first thickness, a cavity arranged between the membrane and the microphone, wherein the second part of the sidewall is arranged adjacent to the cavity, and wherein the cavity is arranged within the sidewall, and at least one support element positioned in the cavity and directly contacting the second part of the sidewall, wherein the at least one support element retains the microphone at a fixed position relative to at least one of the housing and the sidewall of the housing.

2. The microphone device of claim 1, wherein the membrane covers the cavity.

3. The microphone device of claim 1, wherein the cavity is confined by the sidewall of the waterproof closed housing, or wherein the cavity is confined by the second part of the sidewall of the housing, and the at least one support element.

4. The microphone device of claim 1, wherein the at least one support element seals the cavity against an inner space of the housing.

5. The microphone device of claim 1, wherein at least a part of the at least one support element is embedded within the cavity of sidewall of the housing.

6. The microphone device of claim 1, wherein the microphone is at least one of arranged on the at least one support element opposite the membrane or adjacent to the cavity, and wherein the at least one support element comprises an opening between the cavity and the microphone.

7. The microphone device of claim 1, wherein at least one of the cavity or the at least one support element has a conical or cylindrical shape.

8. The microphone device of claim 1, wherein the at least one support element is made of plastic or rubber.

9. The microphone device of claim 1 comprising a plurality of microphones arranged as a microphone array.

10. The microphone device of claim 9, wherein each of the microphones of the microphone array is opposed by one of a respective one of a plurality of membranes or a respective one of a plurality of cavities.

11. A method for generating a microphone device, the method comprising:

providing a waterproof closed housing with a sidewall;

providing a membrane at an outer surface of the sidewall; and;

placing a microphone within the housing and opposite the membrane;

wherein a first part of the sidewall has a first thickness, and wherein the membrane is formed by a second part of the sidewall having a second thickness smaller than the first thickness, forming a cavity within the sidewall of the waterproof closed housing, wherein the cavity is arranged between the microphone and the membrane; and positioning at least one support element in the cavity and directly contacting the second part of the sidewall, wherein the at least one support element retains the microphone at a fixed position relative to at least one of the housing and the sidewall of the housing.

12. A microphone device comprising:

a waterproof housing with a sidewall; and a microphone arranged within the waterproof housing;

a membrane positioned at an outer surface of the sidewall, wherein a first part of the sidewall has a first thickness, and wherein the membrane includes a second part of the sidewall having a second thickness that is smaller than the first thickness, a cavity arranged between the membrane and the microphone, wherein the second part of the sidewall is arranged adjacent to the cavity, and wherein the cavity is arranged within the sidewall, and at least one support element positioned in the cavity and directly contacting the second part of the sidewall, wherein the at least one support element retains the microphone at a fixed position relative to at least one of the housing and the sidewall of the housing.

13. The microphone device of claim 12, wherein the membrane covers the cavity.

14. The microphone device of claim 12, wherein the cavity is confined by the sidewall of the waterproof housing, or wherein the cavity is confined by the second part of the sidewall of the waterproof housing, and the at least one support element.

15. The microphone device of claim 1, wherein the housing includes a plurality of continuous and closed walls and the sidewall is continuous and closed where the microphone is positioned within the housing and positioned adjacent to the sidewall.

16. The microphone device of claim 1, wherein the at least one support element is positioned in the cavity and separates the second part of the sidewall from the microphone.

17. The method of claim 11 further comprising:

positioning the at least one support element in the cavity; and separating the second part of the sidewall from the microphone with the at least one support element.

18. The microphone device of claim 12, wherein the at least one support element is positioned in the cavity and separates the second part of the sidewall from the microphone.

* * * * *